United States Patent
Altman

(10) Patent No.: US 7,381,379 B2
(45) Date of Patent: *Jun. 3, 2008

(54) SORBENT RE-CIRCULATION SYSTEM FOR MERCURY CONTROL

(75) Inventor: Ralph F. Altman, Chattanooga, TN (US)

(73) Assignee: Electric Power Research Institute, Palo Alto, CA (US)

(*) Notice: Subject to any disclaimer, the term of this patent is extended or adjusted under 35 U.S.C. 154(b) by 114 days.

This patent is subject to a terminal disclaimer.

(21) Appl. No.: 11/449,517

(22) Filed: Jun. 8, 2006

(65) Prior Publication Data

US 2006/0228270 A1    Oct. 12, 2006

Related U.S. Application Data

(62) Division of application No. 10/272,973, filed on Oct. 16, 2002, now Pat. No. 7,060,229.

(51) Int. Cl.
*B01D 50/00* (2006.01)
*B03C 3/14* (2006.01)

(52) U.S. Cl. .............................. 422/172; 96/55
(58) Field of Classification Search ............ 422/171; 96/55, 50, 61; 423/244.01
See application file for complete search history.

(56) References Cited

U.S. PATENT DOCUMENTS

| | | | |
|---|---|---|---|
| 5,158,580 A | 10/1992 | Chang | 55/6 |
| 5,505,766 A | 4/1996 | Chang | 95/134 |
| 5,683,494 A | 11/1997 | Altman et al. | 96/55 |
| 6,096,118 A | 8/2000 | Altman et al. | 96/50 |
| 6,103,205 A | 8/2000 | Wojtowicz et al. | 423/210 |
| 6,149,713 A | 11/2000 | Ochi et al. | 95/28 |

*Primary Examiner*—Glenn Caldarola
*Assistant Examiner*—Tom Duong
(74) *Attorney, Agent, or Firm*—Curatolo Sidoti Co., LPA

(57) ABSTRACT

A flue gas purification system comprising in the flue gas stream an electrostatic precipitator, mercury sorbent injection and a two-stage electrostatic separator, and wherein the mercury sorbent injection is positioned between the electrostatic precipitator and the two-stage electrostatic separator.

1 Claim, 6 Drawing Sheets

US 7,381,379 B2

SORBENT RE-CIRCULATION SYSTEM FOR MERCURY CONTROL

RELATED APPLICATION

This application is a division of Ser. No. 10/272,973 filed Oct. 16, 2002; and is now U.S. Pat. No. 7,060,229.

FIELD OF THE INVENTION

The herein disclosed invention finds applicability in the field of flue gas purification, resulting particularly from the burning of coal.

BACKGROUND OF THE INVENTION

Sorbent addition to the flue gas in the duct ahead of an ESP (Electrostatic Precipitator) is a process that is being used as a method to reduce mercury emissions from coal burning power plants. As currently practiced a sorbent, such as activated carbon, is added to the flue gas upstream of a particulate control device, either an electrostatic precipitator or fabric filter. If the sorbent is added ahead of a precipitator, mercury removal is limited to 60-70%, and higher rates of sorbent addition are needed to produce these levels of mercury removal than with baghouses. The inefficiency of this process results from the typical short flue gas residence time between the point of addition of sorbent and the ESP. This prior art process also mixes the sorbent with the collected fly ash, and the carbon in the ash can limit its use as an ingredient in concrete. If the sorbent is added to the flue gas after it leaves the ESP and before a "polishing" baghouse, better sorbent utilization is achieved and high mercury removal rates result, but the polishing baghouse can be an expensive item. An alternate approach that overcomes these disadvantages is described in this invention. The herein disclosed invention utilizes a two-stage electrostatic precipitator or electrostatically enhanced separator (EES), which is a particulate polishing device developed by EPRI. This two-stage electrostatic precipitator is a mechanically augmented electrostatic device that separates flue gas into two separate gas streams; a clean stream that contains very little ash and a bleed stream that contains most of the ash.

PRIOR ART PATENTS OF INTEREST

Ochi (U.S. Pat. No. 6,149,713) teaches a flue gas treating process employing an electrostatic precipitator introduced into the absorption tower of a desulfurizer based on lime-gypsum. Flue gas discharged from the boiler is introduced to an air heater and air supplied to the boiler is heated by the flue gas and the flue gas is then sent to a heat recovery unit. The cooled flue gas is sent to an ESP. Flue gas leaving the ESP is desulfurized and the flue gas is then discharged.

Chang (U.S. Pat. No. 5,505,766) teaches a method for removing pollutants from flue gas by using a sorbent in a baghouse having a filter bag therein. The method involves having the flue gas exit through an outlet duct. An electrostatic precipitator is used in a method along with a baghouse. A sorbent is used for the baghouse filters. The filters are periodically recoated with sorbent. Note, particularly, sorbent suitable for mercury removal is employed (col. 4, line 50).

Chang (U.S. Pat. No. 5,158,580) teaches a particle collector for removing pollutants from flue gas. An electrostatic precipitator is used in the process as well as a filter. A baghouse can be employed in the process of flue gas purification.

Wojtowicz (U.S. Pat. No. 6,103,205) teaches the use of activated carbon to absorb mercury from flue gas. A process for recovering the mercury from the absorbent is also disclosed.

None of the prior art patents teach the system for removing mercury as taught by the herein disclosed invention.

BRIEF SUMMARY OF THE INVENTION

The new technology takes advantage of the two-stage electrostatic precipitator's ability to concentrate particulate matter into a fraction of the flow that the device is treating. In fact, if the particulate matter has a diameter of 10 μm or greater, the separation efficiency is extremely high, well over 90%. Sorbents used for mercury capture can be produced with effective diameters that are 10 μm or greater and hence, these sorbents would be concentrated with high efficiency into the bleed stream.

Exemplifying two-stage electrostatic precipitators are Altman et al U.S. Pat. No. 6,096,118 entitled "Electrostatic Separator for Separating Solid Particles from a Gas Stream" herein described below, and Altman et al U.S. Pat. No. 5,683,494 entitled "Electrostatically Enhanced Separator (EES)".

DESCRIPTION

Figure 1:
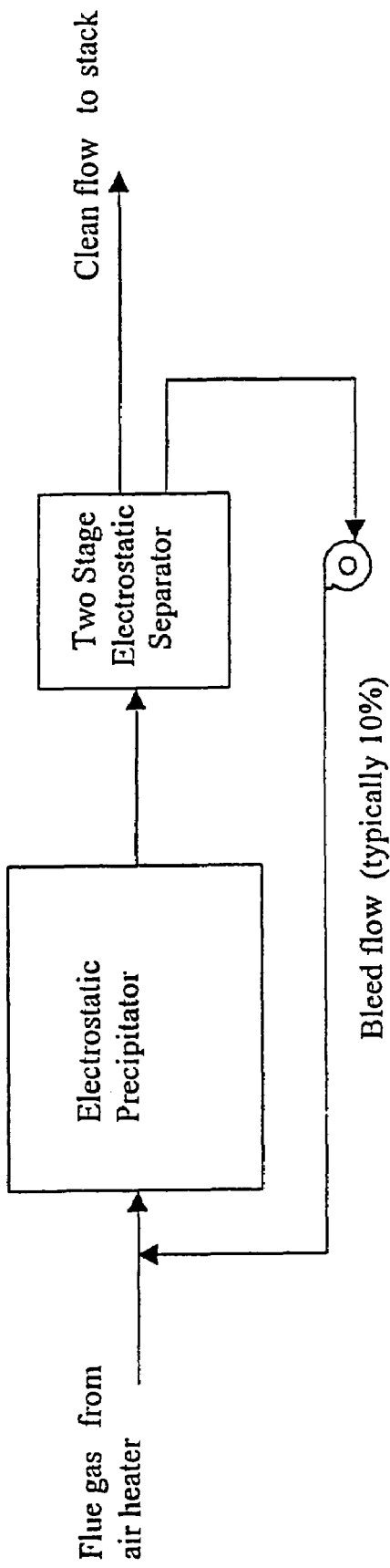
FIG. 1 is a schematic representation of a typical prior art flue gas purifier system.

The concept of this invention is illustrated in FIGS. 1-6. FIG. 1 illustrates how the prior art two-stage electrostatic precipitator is used as particulate polishing device. For this purpose, a two-stage electrostatic precipitator is inserted into the duct work between an existing ESP and the stack. Typically, 10% of the total flow entering the two-stage electrostatic precipitator would be returned to the inlet of the ESP for final collection of the particulate matter concentrated in this stream. The clean flow is sent to the stack. In this process, the particulate matter is "trapped" in a loop until it is finally collected in the ESP.

Figure 2:
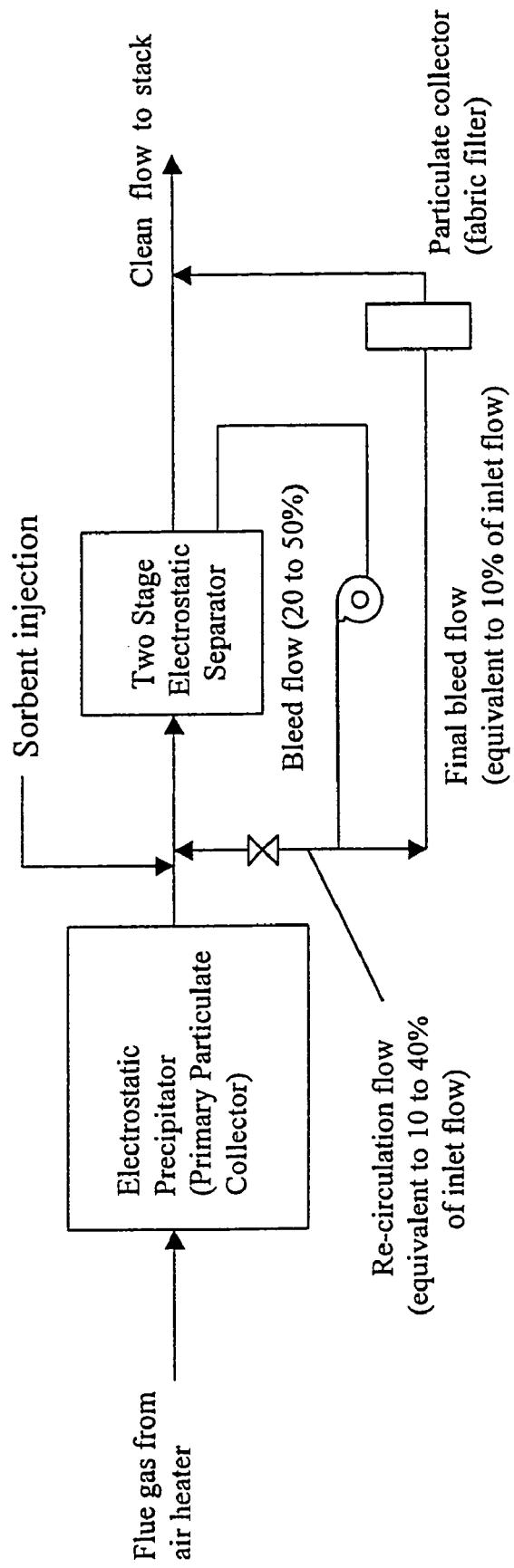
FIG. 2 is a schematic representation of a flue gas purifier employing the sorbent re-circulation system for mercury control of this invention employing re-circulation and particulate fabric filter.

With reference to FIG. 2, there is shown a schematic representation of this invention which has a sorbent re-circulation system for mercury control. The system encompasses an electrostatic precipitator (ESP) up stream from a two-stage electrostatic separator. A mercury sorbent injection device is placed between the ESP and the two-stage electrostatic separator. This two-stage separator is an electrostatically enhanced separator (EES) which provides mechanical separation as well as electrostatic separation and provides a compact and highly efficient separation system. The two-stage electrostatic separator (or EES) is described in U.S. Pat. No. 6,096,118 and in U.S. Pat. No. 5,683,494 (see FIG. 6). The entire contents of these patents are herein incorporated by reference.

In greater detail FIG. 2 describes a schematic representation of the sorbent re-circulation system for mercury control which has flue gas from an air heater entering an electrostatic precipitator. Once the flue gas leaves the electrostatic precipitator, it passes through a mercury absorbent where mercury present in the flue gas is absorbed. As understood by this invention, the mercury absorbent (e.g., activated carbon or powdered clays) is blown as a powder through jets to absorb the mercury. Upon passing the mercury absorbent area, the flue gas passes through a two-stage electrostatic precipitator wherein a part of the flue gas which has been adequately cleaned passes up the stack and a second part of the flue gas, namely a bleed flow of the flue gas containing particles leaves the two-stage electrostatic precipitator. Part of this bleed flow (20% to 50%) is sent back to reenter the two-stage electrostatic precipitator and part is sent through a fabric filter particle collector and then to the stack. Sorbent injection probes (e.g., powder injection) are added to the duct work connecting the ESP to the two-stage electrostatic precipitator. The bleed flow is increased from the nominal 10% level to 20 to 50% of the inlet flow. A fraction of the bleed flow, equivalent to 10% of the flow, that would have entered the two-stage electrostatic precipitator without re-circulation is sent to the small particulate collector, preferably a fabric filter. The rest of the bleed flow is re-circulated to the duct leading to the two-stage electrostatic precipitator. In this case, the sorbent is trapped in this re-circulation loop and its concentration in the flue gas is greatly increased. This increase in concentration enhances mercury removal and improves sorbent utilization. Since the sorbent is collected in a device different from the ESP, it does not contaminate the fly ash collected in the ESP. Thus, the fly ash can be sold as a commercial byproduct.

Figure 3:
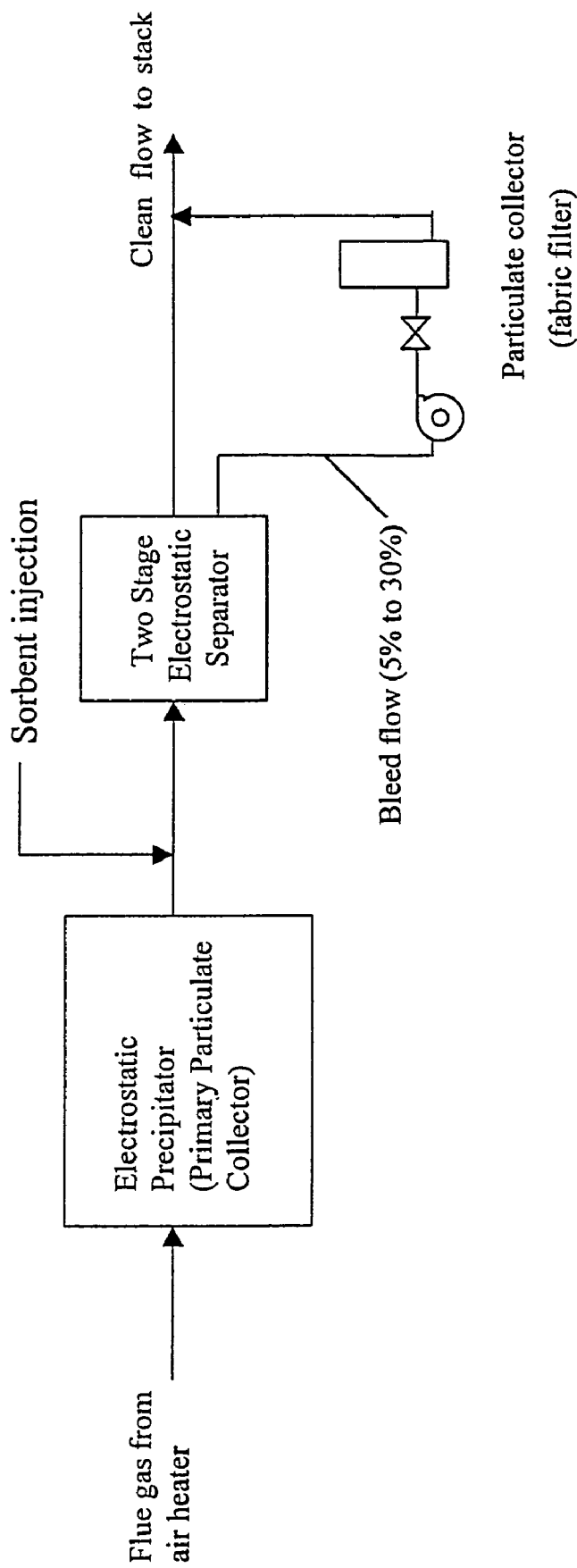
FIG. 3 is a schematic representation of an alternative embodiment of this invention involving mercury sorbent injection along with a two-stage electrostatic separator and particulate fabric filter.

With reference to FIG. 3, an alternative embodiment of the mercury adsorption system is described. In this system, flue gas from the air heater enters the electrostatic precipitator (ESP or primary particulate collector) and exits partially cleansed. Upon leaving the ESP, the cleansed flue gas is treated by the injection of a mercury sorbent which absorbs the mercury in the stream. Most of the treated flue gas leaves the two-stage electrostatic separator as a clean flow and goes to the stack. A second portion leaves the two-stage electrostatic separator as a bleed flow (5 to 30%) and is sent a particulate collector (e.g., fabric filter) and then to the stack.

Figure 4:
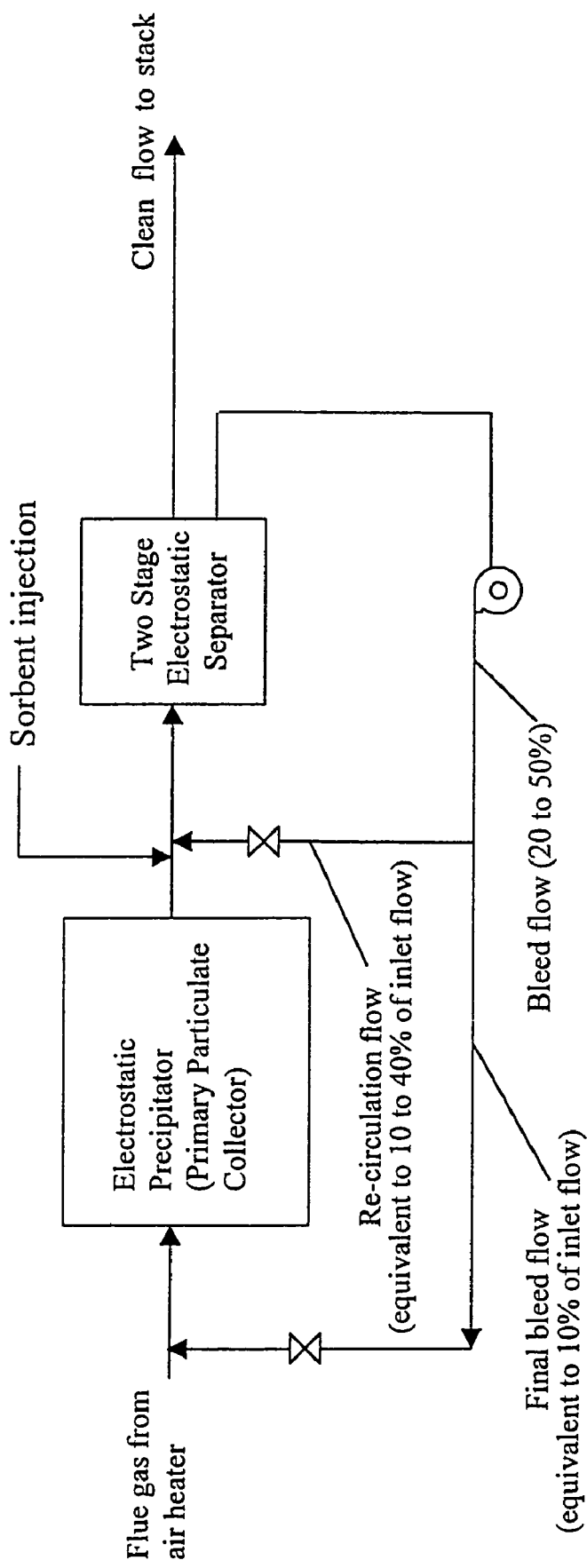
FIG. 4 is a schematic representation of a further alternative embodiment of the invention involving mercury sorbent injection with re-circulation from the two-stage electrostatic separator to the ESP and also back to the two-stage electrostatic separator.
Figure 5:
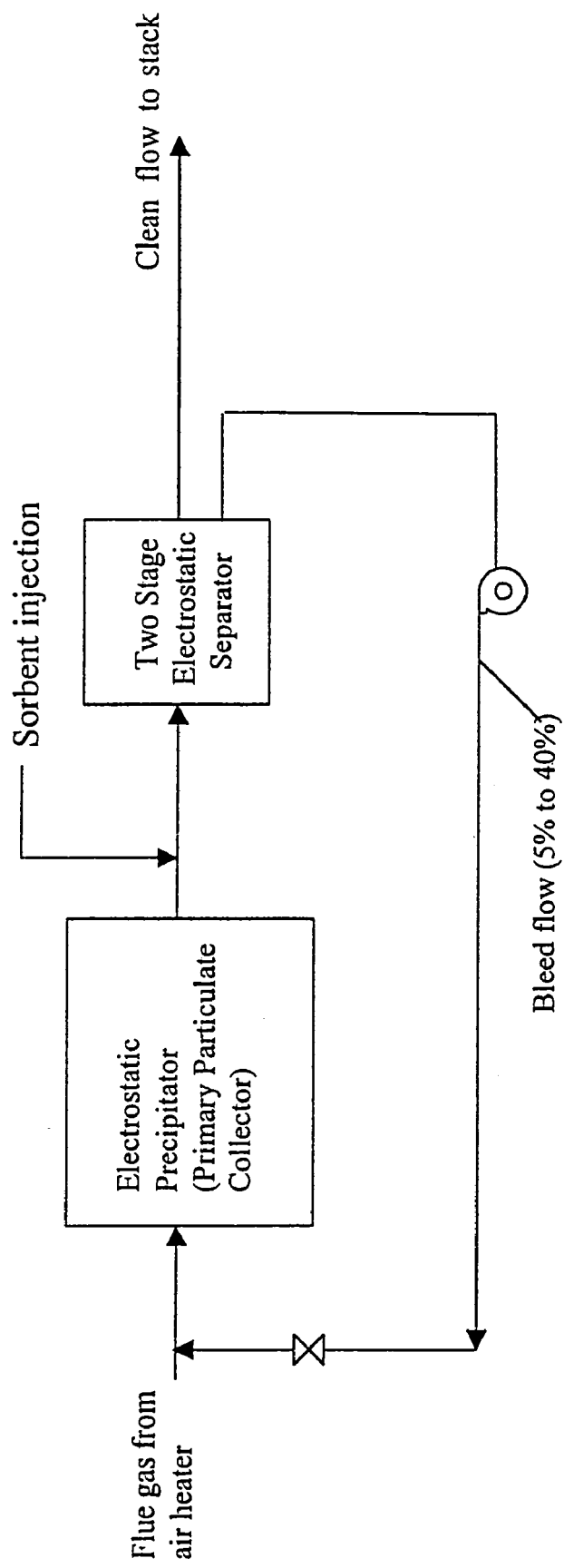
FIG. 5 is a still further schematic representation of an alternative embodiment involving mercury sorbent injection with an alternative flow from the two-stage electrostatic separator.

With regard to FIG. 4, a further alternative embodiment of the mercury sorbent system of this invention has sorbent injection between the electrostatic precipitator (ESP) and the two-stage electrostatic separator (EES, electrostatically enhanced separator). FIG. 4 describes a process by which flue gas from an air heater passes through an ESP is treated with a mercury adsorbent such as charcoal and sent to a two-stage electrostatic separator (EES). A major portion of the flue gas leaving the EES is clean and goes as the clean flow to the stack. A bleed flow portion (20 to 50%) is divided into a first portion, re-circulation flow (equivalent to 10 to 40% of inlet flow) is returned to the two-stage electrostatic separator for further cleaning and a second, final bleed flow (equivalent to 10% of inlet flow) is returned to the ESP.

Another alternative schematic representation of the mercury sorbent re-circulation system of this invention (FIG. 5) has the flue gas from the air heater entering the ESP to be cleaned. In the ESP particles from the flue gas are trapped by the plates of the ESP and then deposited into hoppers (not shown). The flue gas leaves the ESP and is treated by mercury sorbent injection and enters the two-stage electrostatic separator (EES) wherein a clean portion (or clean flow) goes to the stack. A second portion leaves the EES as a bleed flow (5% to 40%) and is returned to the ESP for retreatment.

Figure 6:
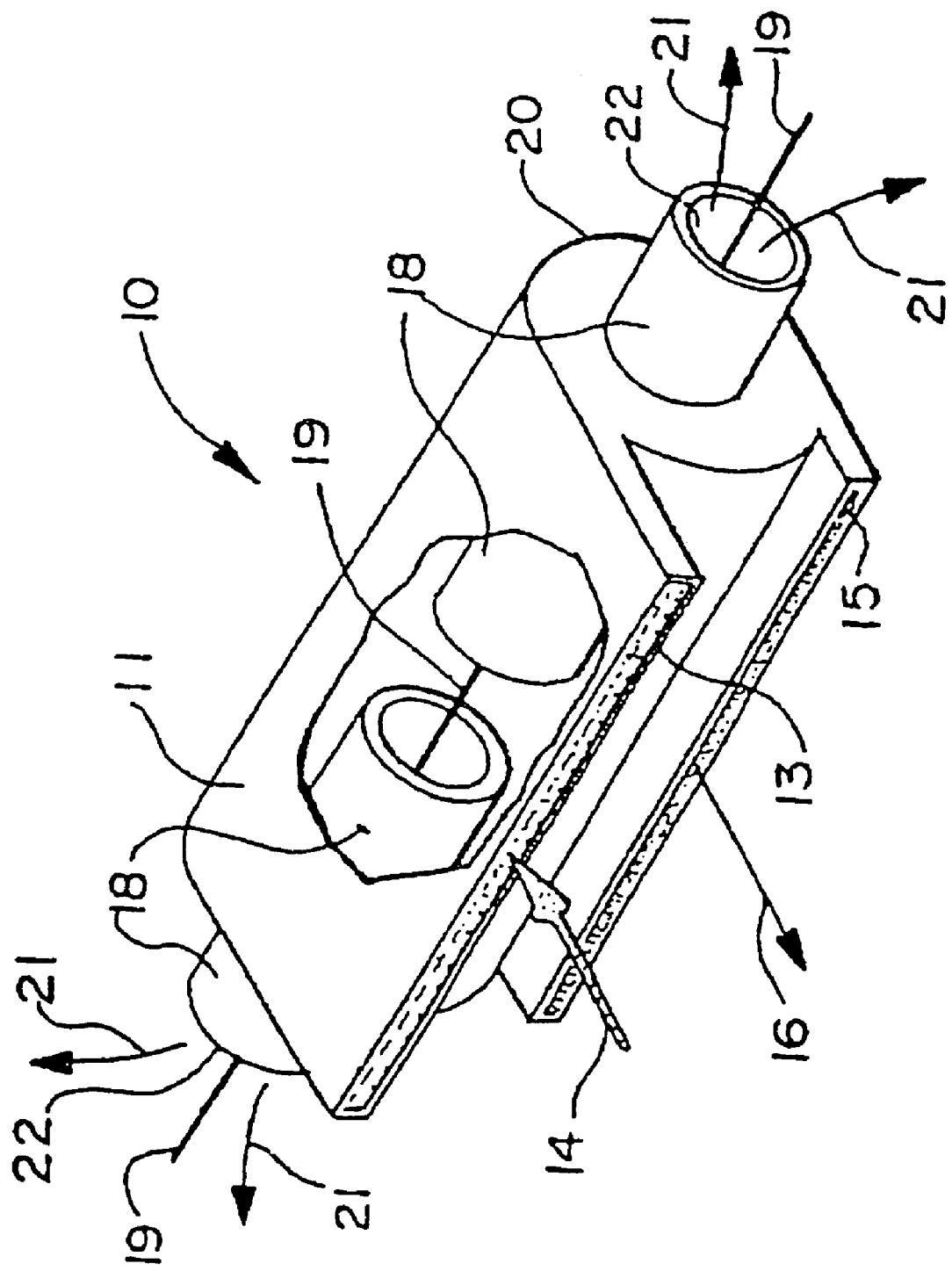
FIG. 6 is a figure illustrating a two-stage electrostatic precipitator that can be used in carrying out the herein disclosed invention.

With regard to FIG. 6, the preferred two-stage electrostatic separator or electrostatically enhanced separator (EES) is exemplified in U.S. Pat. No. 5,683,494 to Altman et al, the entire contents of which is incorporated herein. The device includes a cylindrical separation vessel 11 having a thin elongated inlet passage 13 for admitting the solid particle and/or mist laden gas stream 14. The separation vessel 11 is likewise provided with a thin elongate outlet passage 15 for expelling the separated particles in the form of a concentrated "bleed flow" 16. Both the inlet passage 13 and the outlet passage 15 are in fluid communication with the separation vessel 11 and maintain a tangential fluid flow with respect to the walls 17 of the separator chamber 11. It is important that both the inlet passage 13 and outlet passage 15 be formed as narrow slits to distribute the fluid flow lengthwise between its opposing ends along the cylindrical walls of the separation vessel 11. This insures that all particulates enter and exist the separator vessel 11 proximate to the walls 17 thereof, and such proximity, first, greatly improves the separator (EES) 10 separation efficiency because the turbulent diffusion processes causing the particulate re-entrainment are less intensive in the region adjacent to the separator walls 17, and secondly, eliminates the corona suppression problem due to very low particulate concentration in the EES core.

The separator 10 further includes two vortex finders 18 which are formed as cylindrical tubes.

A discharge electrode 19 extends centrally throughout the vortex finders 18. A power supply is connected between the walls 17 of the separation vessel 11 and the discharge electrode 19 for establishing an electric potential therebetween which serves to charge the particles entrained in the separation vessel 11 and to repel charged particles toward the separation walls 17.

Gas stream 14 enters the elongate inlet passage 13 and is introduced tangentially into the separator vessel 11. This creates a vortex inside the separation vessel 11. As the particles are swirled in the separation vessel 11, the inertia of the heavier particles will propel them outward toward the wall 17 of the separation vessel 11. The particles will remain in the separator 10 for at least 180° revolution, and will eventually be expelled from the separator 10 through the outlet passage 15. This mechanical separation is electrostatically enhanced by the discharge electrode 19. A voltage potential is applied to the discharge electrode 19 with respect to the outer walls 20 of the separation vessel 11, and this forms an electrostatic field within said vessel 11, where the particulate charging and electrostatic separation are provided. The polarity of the potential applied to the discharge electrode 19 is the same as the charge imparted on the particles. This way, the electrostatic field repels the particles and their entry into the separation core is prevented. At the same time, sanitized gas 21 is free to flow outward through the clean gas outlets 22.

The inertial separation coupled with electrostatic separation in the separation vessel 11 results in a very pure clean gas stream 21 flowing from the clean gas outlets 22. In contrast to the existing electrostatically enhanced cyclones, all particles enter and exit the separator vessel 11 proximate the separator walls 17, and particulate separation processes are less intensive than that in the separator core. That predetermines very high EES separation efficient.

As an alternative embodiment of this invention, the inventor contemplates employing a two-stage electrostatic separator as defined in U.S. Pat. No. 6,096,118 to Altman et al, the entire contents of which is herein incorporated by reference. The patent sets forth a two-stage electrostatic separator for separating particles from a particle laden gas stream and includes a pre-charging section and spaced-apart gas-permeable grounded, discharge electrodes charged at opposite polarities and defining a separating section between them. The grounded electrode being positioned upstream from the discharge electrode. The particles in the particle laden gas stream are pre-charged to a certain charge in the pre-charging section and penetrate through the grounded electrode into the separating section, where the particles are separated from the particle laden gas stream. As a result, a clean gas stream exits from the separating section through the discharge electrode, and the particles separated from the particle laden gas stream are partially collected on the grounded electrode, and partially are removed with a bleed flow which is re-circulated. The electrodes may be of linear or cylindrical shape, and linear electrodes may be arranged in a "zig-zag" order.

In the mercury sorbent system of this invention, the amount of mercury absorbent added is initially 1 to 10 pounds per million actual cubic feet and as the process proceeds can build up to a factor of one to ten.

The mercury absorbed on the sorbent is either removed by the particulate collector or by the electrostatic precipitator during re-circulation.

There are many advantages attendant to employing the system of this invention. For example:

1. The process of this invention overcomes the low efficiency of the sorbent addition before an ESP approach for mercury control.

2. The invention avoids the pressure drop problems associated with sorbent addition before a fabric filter.

3. With the use of the inventive process, there is retained the ability to sell commercially acceptable fly ash.

4. The invention has the capability of providing very high mercury removal levels with good sorbent utilization low pressure drop (the pressure drop across the two-stage electrostatic precipitator is approximately 0.5 inches of water).

5. The two-stage electrostatic precipitator with re-circulation can be added after a primary particulate control collection device treating a gas contaminated with mercury to provide effective mercury control.

Demonstration

The concept of this invention has been demonstrated in 1.5 MW pilot tests at Alabama Power Company's Plant Gaston. Preliminary mercury removal tests indicated relatively high mercury removal at moderate sorbent addition rates.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A flue gas purification system comprising in the flue gas stream: 1) an electrostatic precipitator, 2) a solid mercury sorbent injection device and 3) a two-stage electrostatic separator having a clean flow stream and a bleed stream and wherein the solid mercury sorbent injection device is placed between the electrostatic precipitator and the two-stage electrostatic separator such that in operation the solid mercury sorbent is directed to a treated stream between the electrostatic precipitator and the two stage electrostatic separator; wherein a first portion of flue gas leaves the two-stage electrostatic separator, goes to the clean flow stream and a second bleed flow portion is divided into a first divided portion and a second divided portion; wherein the first divided portion is returned to the two-stage electrostatic separator and the second divided portion is returned to the electrostatic precipitator.

* * * * *